(12) United States Patent
Toda et al.

(10) Patent No.: US 10,307,967 B2
(45) Date of Patent: Jun. 4, 2019

(54) METHOD FOR MANUFACTURING LIQUID-EJECTING HEAD

(71) Applicant: CANON KABUSHIKI KAISHA, Tokyo (JP)

(72) Inventors: Kyosuke Toda, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Naoko Tsujiuchi, Kawasaki (JP); Yasushi Iijima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 350 days.

(21) Appl. No.: 15/156,559

(22) Filed: May 17, 2016

(65) Prior Publication Data

US 2016/0346969 A1    Dec. 1, 2016

(30) Foreign Application Priority Data

May 25, 2015    (JP) .................................. 2015-105118

(51) Int. Cl.
  *B28B 7/22*    (2006.01)
  *B29C 65/70*    (2006.01)
  (Continued)

(52) U.S. Cl.
  CPC .......... *B29C 65/70* (2013.01); *B29C 45/0062* (2013.01); *B41J 2/14* (2013.01);
  (Continued)

(58) Field of Classification Search
  CPC . B29C 45/0003; B29C 45/04; B29C 45/0408; B29C 45/0416; B29C 45/006;
  (Continued)

(56) References Cited

U.S. PATENT DOCUMENTS 5,641,184 A * 6/1997 Mortensen ............ A61M 39/04
                                                    264/271.1
5,833,903 A * 11/1998 Centofante ....... B29C 45/14311
                                                    264/155

(Continued)

FOREIGN PATENT DOCUMENTS

JP      4-331114 A      11/1992
JP      H0592450 A   *   4/1993   ......... B29C 45/0025
(Continued)

OTHER PUBLICATIONS

Amma et al., U.S. Appl. No. 15/156,583, filed May 17, 2016.
(Continued)

*Primary Examiner* — William P Bell
*Assistant Examiner* — Andrew L Swanson
(74) *Attorney, Agent, or Firm* — Venable LLP (57) ABSTRACT

Provided is construction that in die slide injection molding, surely leaves each part in a mold on a specified side in the stage of opening a molding mold. In order to accomplish this, in an opening step, a push-out mechanism that applies a force on at least one of the individual parts is used to make the part surely belong to a desired mold.

4 Claims, 10 Drawing Sheets

(51) Int. Cl.
*B29C 45/00* (2006.01)
*B41J 2/14* (2006.01)
*B41J 2/16* (2006.01)
*B41J 2/175* (2006.01)
*B29L 31/00* (2006.01)
*B29C 45/16* (2006.01)

(52) U.S. Cl.
CPC ............... *B41J 2/16* (2013.01); *B41J 2/1752* (2013.01); *B41J 2/1753* (2013.01); *B29C 45/1615* (2013.01); *B29C 2045/0063* (2013.01); *B29C 2045/1623* (2013.01); *B29C 2045/1637* (2013.01); *B29L 2031/767* (2013.01)

(58) Field of Classification Search
CPC ........ B29C 45/0062; B29C 2045/0068; B29C 45/1628; B29C 2045/1629–1632; B29C 45/162–2045/1623; B29C 45/1615; B29C 2043/503–5038; B29C 45/06–062
See application file for complete search history.

(56) References Cited

U.S. PATENT DOCUMENTS

| | | | |
|---|---|---|---|
| 6,365,083 | B1 | 4/2002 | Nishida |
| 6,805,437 | B2 | 10/2004 | Yamanaka et al. |
| 2002/0056933 | A1* | 5/2002 | Kamiguchi ......... B29C 45/4005 264/40.1 |
| 2007/0264415 | A1* | 11/2007 | Axelrod ................. A23K 50/40 426/623 |
| 2010/0171798 | A1* | 7/2010 | Yamaguchi .......... B41J 2/16532 347/85 |

FOREIGN PATENT DOCUMENTS

| | | |
|---|---|---|
| JP | 2000-153538 A | 6/2000 |
| JP | 2001-272109 A | 10/2001 |
| JP | 2002-178538 A | 6/2002 |
| JP | 2002-307709 A | 10/2002 |
| JP | 2012-192749 A | 10/2012 |
| WO | 2009/122862 A1 | 10/2009 |

OTHER PUBLICATIONS

Oikawa et al., U.S. Appl. No. 15/151,880, filed May 11, 2016.
Iwano et al., U.S. Appl. No. 15/156,649, filed May 17, 2016.
Tsujiuchi et al., U.S. Appl. No. 15/157,909, filed May 18, 2016.
Iwano et al., U.S. Appl. No. 15/156,578, filed May 17, 2016.
Oikawa et al., U.S. Appl. No. 15/157,890, filed May 18, 2016.
Kimura et al., U.S. Appl. No. 15/156,569, filed May 17, 2016.
Notification of Reasons for Refusal in Japanese Application No. 2015-105118 (dated Jan. 22, 2019).

* cited by examiner

METHOD FOR MANUFACTURING LIQUID-EJECTING HEAD

BACKGROUND OF THE INVENTION

Field of the Invention

The present invention relates to a method for manufacturing a liquid-ejecting head for ejecting liquid such as ink as a drop.

Description of the Related Art

In a liquid-ejecting head that ejects liquid as drops for forming a photograph, a document, a 3-dimensional structure and the like, liquid paths for receiving the liquid from tubes or tanks and directing it to plural ejection elements are formed. For example, Japanese Patent Laid-Open No. 2002-178538 discloses a form of forming a groove shape in a liquid path in order to prevent the supply of liquid from being obstructed due to the occurrence of air bubbles. Moreover, for example, in the case of a color-inkjet printing head that receives plural inks and leads those inks to corresponding ejection elements, flow paths from ink-supply openings to the ejection elements must be prepared independently for each color of ink. In this case, it is also necessary to have hollow internal construction in which the size of liquid chambers for temporarily storing the respective inks can be maintained to a certain extent, and that bends in guiding each of the inks to ejection elements for each color that are highly densely arranged in a narrow area. Therefore, in recent liquid-ejecting heads, that hollow internal construction has become complicated.

Typically, from the aspect of ease of manufacturing, lightness and prevention of corrosion, the liquid paths in a liquid-ejecting head are often formed in a resin mold. Japanese Patent Laid-Open No. 2002-307709 discloses a method of simultaneously forming plural parts at different locations inside the same mold, and then joining the parts later inside the same mold in order to achieve the complicated internal construction as described above. Hereafter, this kind of manufacturing method will be called die slide injection molding. By employing die slide injection molding, it becomes possible to efficiently manufacture molded parts having complicated internal construction with high precision.

Incidentally, there is a process in die slide injection molding in which after two parts that will be joined together are formed simultaneously at different locations inside the same mold, the mold is opened so that the parts will remain on a specified side.

However, as described above, when parts have complicated internal construction as in recent years, there are cases in which it is difficult with conventional methods to keep each of the parts on a specified side when opening the mold. More specifically, in each of the parts, the separation resistance with respect to the side having the more complicated shape becomes larger than the separation resistance with respect to the other side, so it becomes easy for parts to remain on the side having the more complicated shape. When the side on which it is easy for a part to remain differs from the specified side, the progression of the molding process is obstructed, and there is a drop in the productivity of a process for manufacturing a liquid-ejecting head.

SUMMARY OF THE INVENTION

The present invention was invented in order to solve the problem described above. Therefore, the object of the present invention is to provide construction so that in die slide injection molding, respective parts surely remain on a specified side of the mold when opening the mold.

According to a first aspect of the present invention, there is provided a method for manufacturing a liquid-ejecting head that comprises an ejection-element unit that ejects liquid, and a liquid-supply unit in which a liquid path is formed for guiding the liquid to the ejection element unit; wherein a main mold, and a die slide mold that can slide inside the main mold and in which a mold for molding a first part of the liquid-supply unit and a mold for molding a second part of the liquid-supply unit are arranged in a direction of the slide are prepared; the method including: a first molding step for forming the first part and the second part by injecting resin into the mold for forming the first part and into the mold for forming the second part with the main mold in a closed state; an opening step for opening the main mold so that the first part that was formed by the first molding step belongs to the die slide mold, and the second part separates from the die slide mold; a sliding step for sliding the die slide mold and positioning and aligning the first part and the second part in the direction of the slide; and a second molding step for bringing the first part and second part into contact, and then closing the main mold and molding the liquid-supply unit by injecting resin for connecting the first part and second part together; wherein in the opening step, the first part belongs to the die slide mold and the second part is separated from the die slide mold by using a push-out mechanism that applies a force to at least one of the first part and the second part.

Further features of the present invention will become apparent from the following description of exemplary embodiments (with reference to the attached drawings).

DESCRIPTION OF THE EMBODIMENTS (Embodiment 1)

Figure 1A:
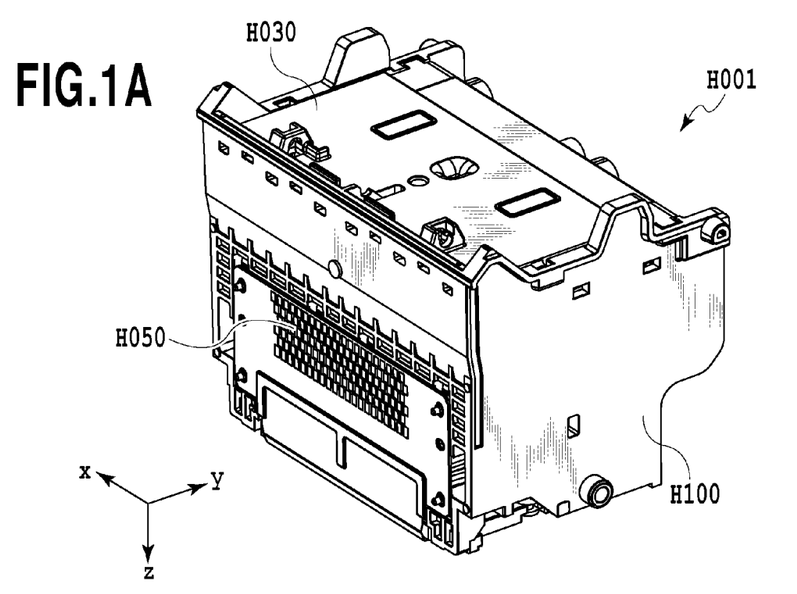
FIG. 1A and FIG. 1B are perspective views of a liquid-ejecting head of Embodiment 1.
Figure 1B:
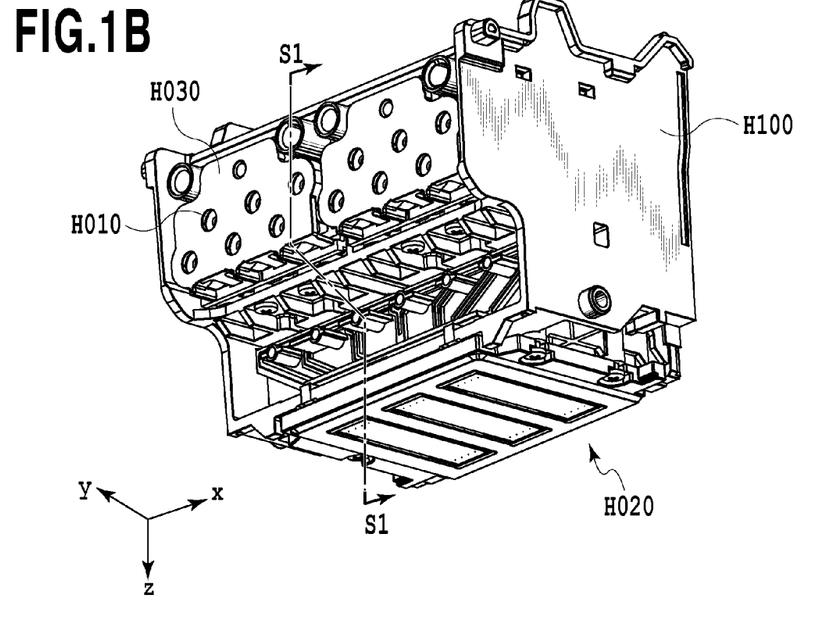

FIG. 1A and FIG. 1B are perspective views as seen from different angles of a liquid-ejecting head H001 that is used in this embodiment. The liquid-ejecting head H001 of this example is a color-inkjet printing head for printing images by ejecting 12 colors of ink. Each of the 12 colored inks is received into a sub-tank H030 by way of a tube that is connected to a supply opening H010. After that, each of the colored inks passes through a liquid-supply member H100 in which independent liquid paths are formed for each ink color, and is guided to an ejection-element unit H020. Plural ejection elements that correspond to each of the inks based on image data are arranged in the ejection-element unit H020, and ejection signals are supplied from an electric connection board H050. The ejection elements eject that ink as drops in the Z direction according to the ejection signals.

Figure 2:
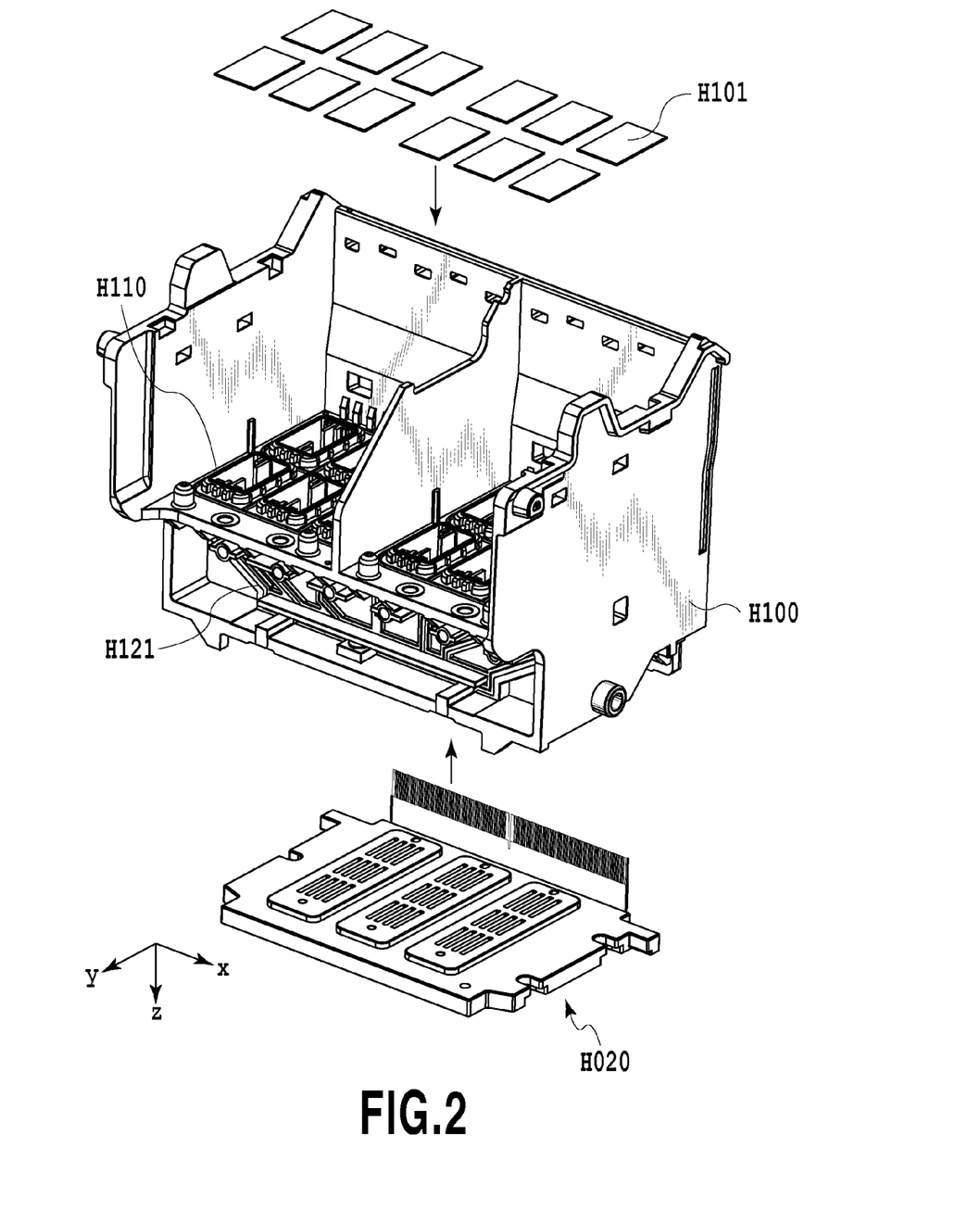
FIG. 2 is an exploded view of a liquid-supply member in Embodiment 1.

FIG. 2 is an exploded view of the liquid-supply member H100. In the liquid-supply member H100, filters H101 that correspond to individual storage chambers corresponding to the ink colors and that are used for removing foreign matter from the liquid are attached to positions connected to the sub-tank H030 in which the individual storage chambers are formed. Liquid chambers H110 are formed between the filters H101 and the ejection-element unit H020 for connecting the two together. Liquid paths having different amounts of bending and different lengths connect upper openings for connecting with the filters H101, and lower openings for connecting to the ejection-element unit H020, and are individually formed in the liquid chambers H110 correspondingly to the 12 colored inks. In this embodiment, the hollow internal construction of each of the liquid chambers H110 is formed by die slide injection molding.

Figure 3:
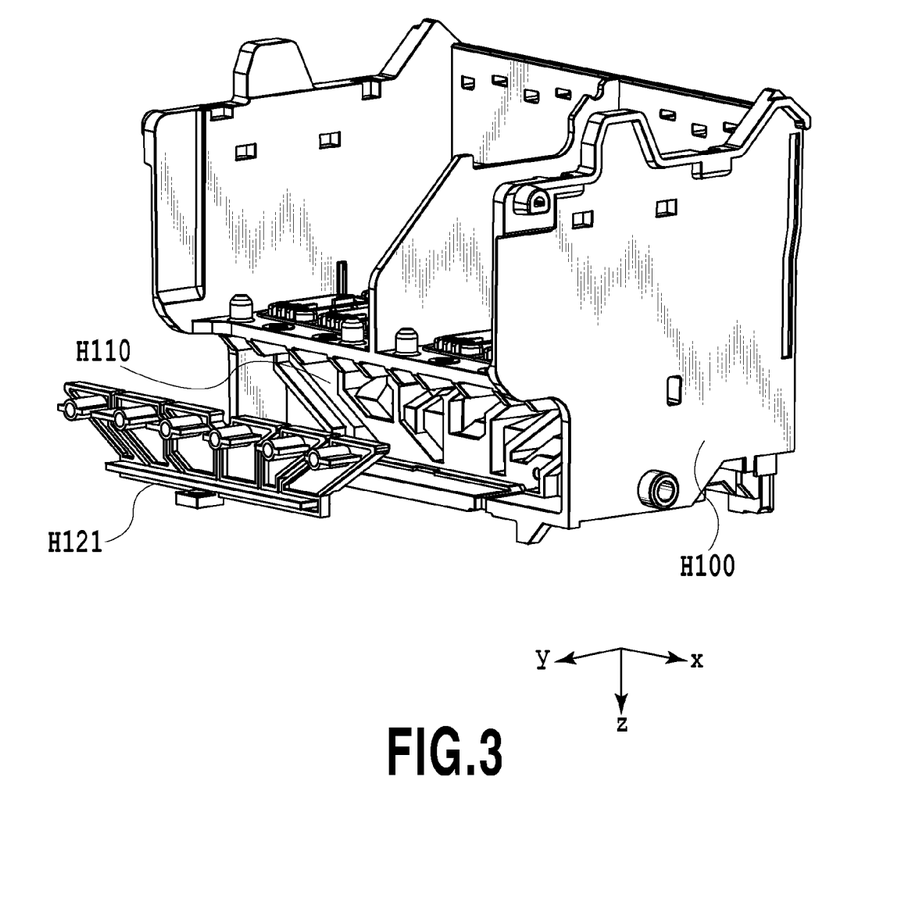
FIG. 3 is a view illustrating two parts that are finally joined.
Figure 4:
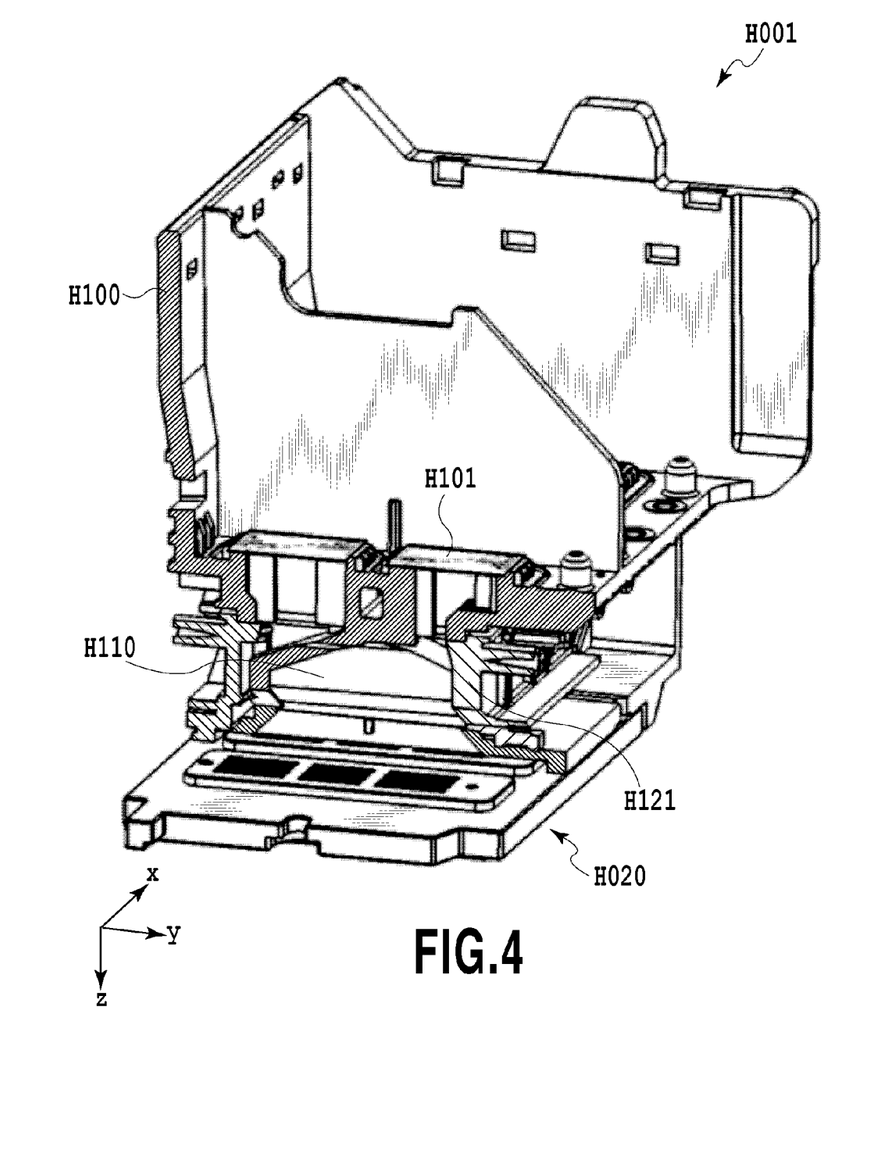
FIG. 4 is a cross-sectional view of a completed liquid-supply member.

FIG. 3 is a view illustrating two parts that are finally connected in the die slide injection molding. In this embodiment, after a liquid-supply member H100 as described above has been formed by molding, a cover member H121 that has similarly been formed by molding is provided so as to face the liquid-supply member H100 from the +Y direction, and the members are joined together. After the liquid chamber H110 is completed by the die slide injection molding, the ejection-element unit H020 and the filters H101 are attached to complete the liquid-supply member H100. FIG. 4 is a cross-sectional view of the completed liquid-supply member H100. This corresponds to the section S1-S1 in FIG.

Figure 5A:
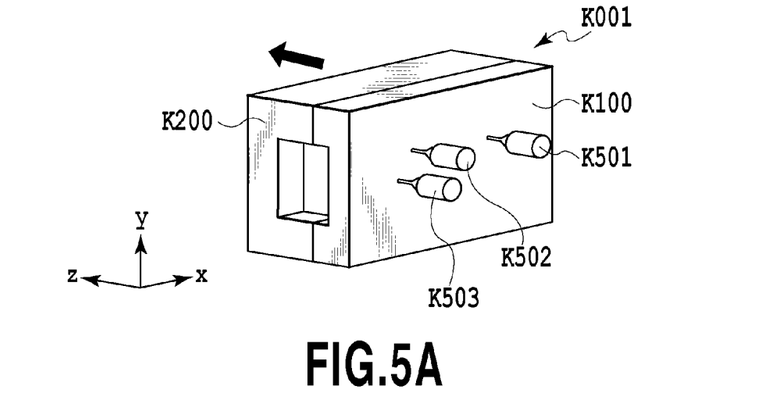
FIG. 5A to FIG. 5C are views illustrating the molding steps for forming a liquid chamber.

FIG. 5A to FIG. 5C and FIG. 6A to FIG. 6D are views illustrating a die slide injection molding process for forming the liquid chamber H110. As can be seen in FIG. 5A, a main mold K001 that is used in this embodiment includes a stationary-side mold K100 and a movable-side mold K200 that can be separated in the Z direction. Furthermore, there is a die slide mold K230 on the side of the movable-side mold K200 that can slide on the inside of the main mold K001 in the X direction with respect to the main mold K001.

Figure 5B:
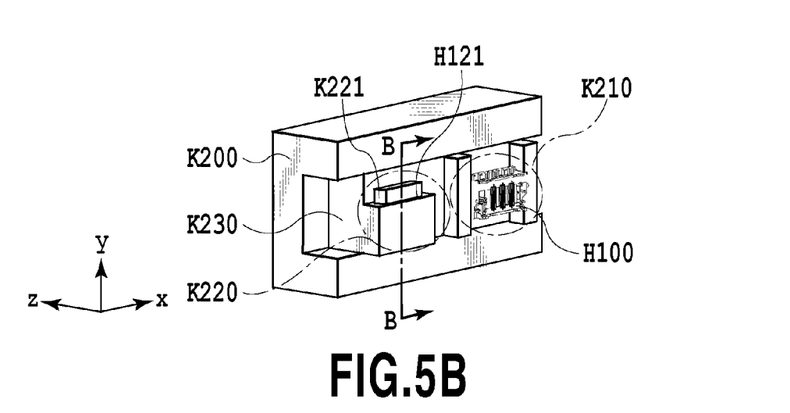

FIG. 5B is a view illustrating the state of the surface of the movable-side mold K200 that faces the stationary-side mold K100. A first molding position K210 for molding the liquid-supply member H100 is formed on the surface where the die slide mold K230 and the stationary-side mold K100 face each other. A second molding position K220 for molding the cover member H121 is formed on the surface where the die slide mold K230 and a mold piece K221 face each other. The first molding position K210 and the second molding position K220 are arranged in positions that are shifted from each other in the X direction. In the view, the liquid-supply member H100 and the cover member H121 after formation are illustrated at their positions for explanation, however, in the stationary-side mold K100 and the die slide mold K230 themselves, molds for forming both are carved at their positions.

In a first step, with the stationary-side mold K100 and the movable-side mold K200 closed as illustrated in FIG. 5A, resin is flowed from an injection nozzle K501 that corresponds to the first molding position K210, and from an injection nozzle K502 that corresponds to the second molding position K220. As a result, the liquid-supply member H100 is molded inside the main mold K001 at the first molding position K210, and the cover member H121 is molded at the second molding position K220. Hereafter, this kind of step will be called a primary-molding step.

In a second step, the moveable-side mold K200 and the stationary-side mold K100 are separated by moving the movable-side mold K200 in the +Z direction with respect to the stationary-side mold K100. FIG. 5B illustrates the state of the movable-side mold K200 in this stage. In this embodiment, both the liquid-supply member H100 and the cover member H121 are attached to the side of the die slide mold K230, or in other words, the side of the movable-side mold K200.

Figure 5C:
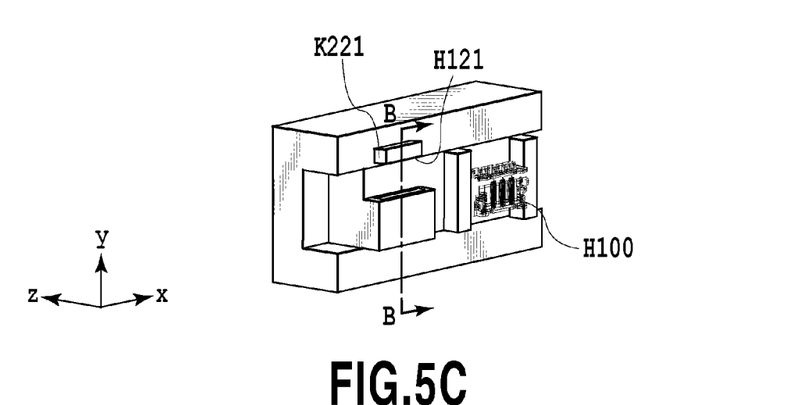

In a third step, the cover member H121 is moved in the +Y direction together with the mold piece K221 that molded one side of the cover member H121 (see FIG. 5C). The mold for molding the cover member 121 in the second molding position K220 is such that the surface on one side is formed by the die slide mold K230 and the surface on the other side is formed by the mold piece K221. In this embodiment, there is provided a mechanism for the molded cover member H121 to separate easily from the die slide mold K230, and when moving the mold piece K221 in the +Y direction, the cover member H121 that is belong to the mold piece K221 also moves in the +Y direction. The construction for separating from the die slide mold K230 and surely belonging to the mold piece K221 in this way will be explained in detail later. The movement of the mold piece K221 is performed by a part slide mechanism using a different driving source (for example a hydraulic cylinder or the like) than that for the movement in the Z direction of the movable-side mold K200 described above.

Figure 6A:
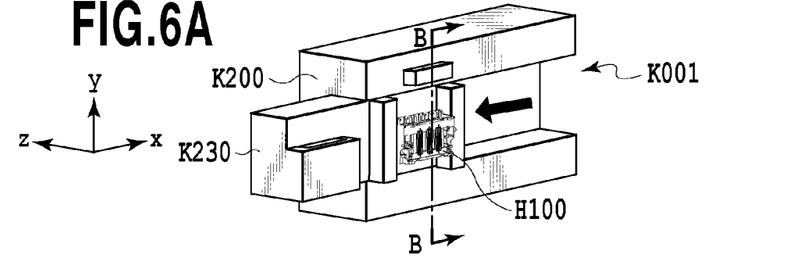
FIG. 6A to FIG. 6D are views illustrating the molding steps for forming the liquid chamber.

In a fourth step, the die slide mold K230 that is located inside the movable-side mold K200 is moved in the −X direction as can be seen in FIG. 6A in order to position and align the liquid-supply member H100 and the cover member H121 in the X direction. The drive source for the movement of the die slide mold K230, as in the case of the mold piece K221, is different than that for the movable-side mold K200.

Figure 6B:
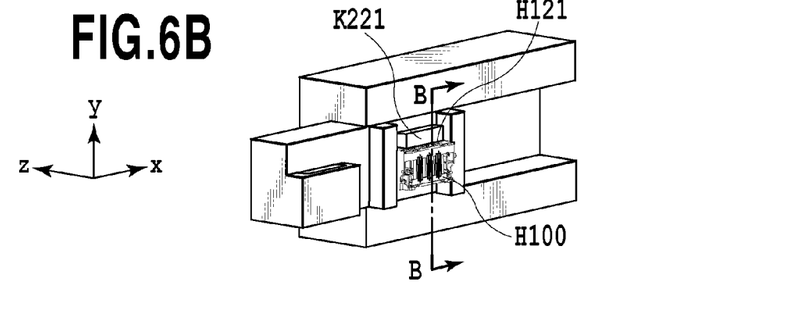

In a fifth step, as can be seen in FIG. 6B, the mold piece K221 is moved in the −Y direction by the return operation of the part slide mechanism, and the cover member H121 is arranged at a specified position of the liquid-supply member H100. As can be seen from FIG. 3 and FIG. 4 that were explained above, the cover member H121 of this embodiment is incorporated at a position that is inside with respect to the width area of the liquid-supply member H100 in the Y direction. In this way, the cover member H121 is moved out of the way in the +Y direction once in the third step, and then it is positioned and aligned with the liquid-supply member H100 in the fourth step, thereafter the cover member H121 is returned in the −Y direction in the fifth step. Therefore, it is possible to avoid a collision between the both parts in the fourth step.

Figure 6C:
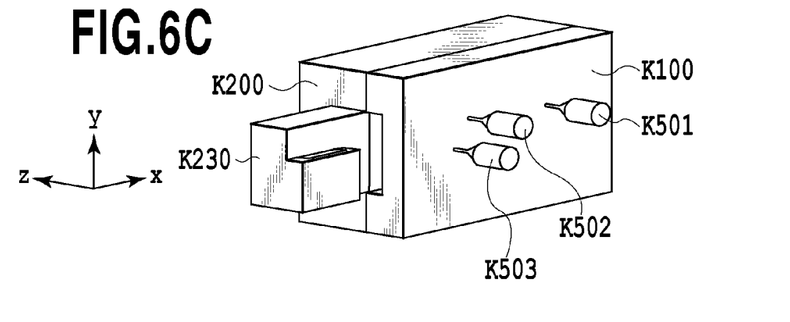

In a sixth step, as can be seen in FIG. 6C, the movable-side mold K200 is moved in the −Z direction, and closes with the stationary-side mold K100. Then, in this state, resin that is compatible with both members is flowed from an injection nozzle K503 at a position where the liquid-supply member H100 and the cover member H121 are joined together. Hereafter, this kind of step will be called a secondary-molding step.

Figure 6D:
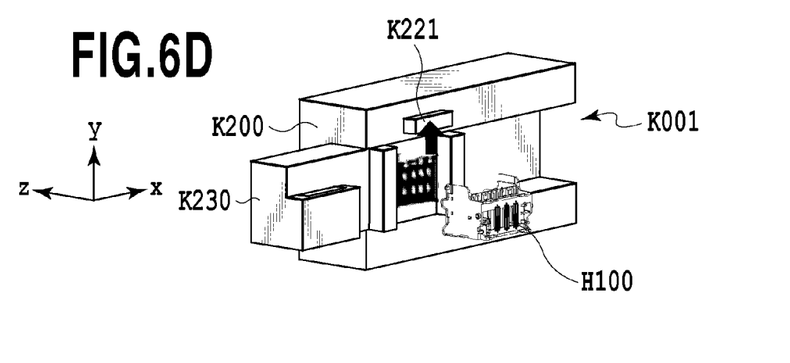

In a seventh step, the main mold K001 is opened, the mold piece K221 is moved out of the way in the +Y direction, and the liquid-supply member H100 having a completed sealed hollow structure is pushed out in the −Z direction. As a result, the completed liquid-supply member H100 that has been joined together with the cover member H121 is obtained (FIG. 6D).

The characteristic construction of this embodiment, or in other words, construction for making it possible to separate the cover member H121 that was molded at the second molding position K220 from the die slide mold K230 and to belong to the mold piece K221 surely will be explained below.

FIG. 7A to FIG. 7E are enlarged cross-sectional views for explaining in detail the second molding position K220 during the first step (FIG. 5A) to fifth step (FIG. 6B) of the die slide injection molding process. Each view illustrates the section B-B in a corresponding one of FIG. 5A to FIG. 6B.

Figure 7A:
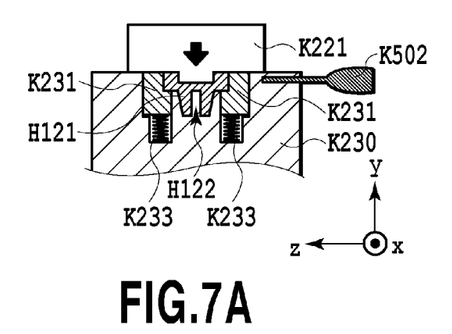
FIG. 7A to FIG. 7E are enlarged cross-sectional views of the second molding position in a molding process.
Figure 7B:
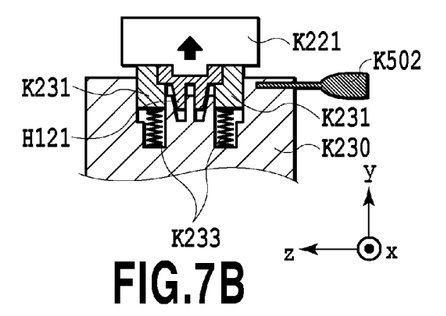

In FIG. 7A, the cover member H121 that is molded by the mold piece K221 and the die slide mold K230 is such that a groove shape H122 is formed on the side of the die slide mold K230. This kind of groove shape H122 is for guiding liquid that passes through the filter H101 to the inside of the liquid-supply member H100 using meniscus force. Moreover, even when the filter H101 is blocked by air bubbles that are generated due to changes in environment and ejection, the groove shape H122 performs the function of promoting stable liquid supply. This kind of groove shape H122 can improve the capability for supplying liquid more as the number of thin grooves formed increases.

Figure 7C:
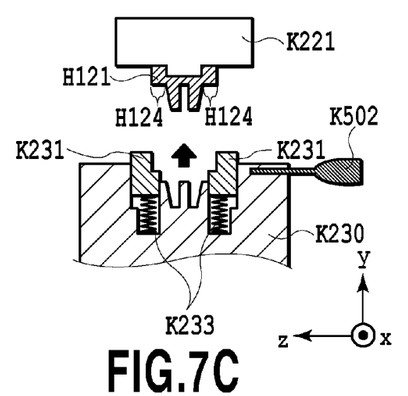

However, the more complicated the groove shape H122 becomes, the larger the separation resistance between the groove shape H122 and the die slide mold K230 becomes. Moreover, when the mold piece K221 is moved in the +Y direction in the third step, the possibility that the cover member H121 will remain on the die slide mold K230 side increases. In order to resist this, push-out mechanisms K231 that support both ends in the Z direction of the molded cover member H121 and springs K233 that press against the push-out mechanisms K231 are provided on the die slide mold K230 of this embodiment. Therefore, when the mold piece K221 is moved in the +Y direction in the third step, the push-out mechanisms K231 that are pressed by the springs K233 push both ends of the cover member H121 toward the mold piece K221. As a result, the cover member H121 as illustrated in FIG. 7C belongs to the mold piece K221 and moves in the +Y direction. In this embodiment, a push-out mechanism K231 and spring K233 that presses the push-out mechanism K231 are provided in the same way on both ends of the cover member H121, so the force for pressing the cover member H121 is the same on both ends, and the cover member H121 moves in the +Y direction without becoming inclined. The push-out mechanisms K232 are stopped at specified strokes by locking mechanisms not illustrated in the view.

Figure 7D:
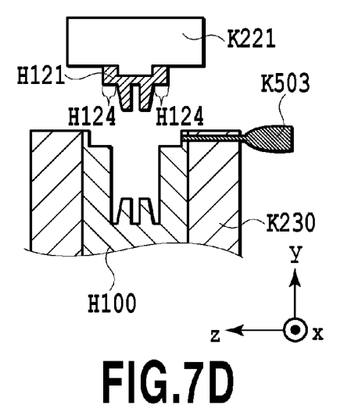
Figure 7E:
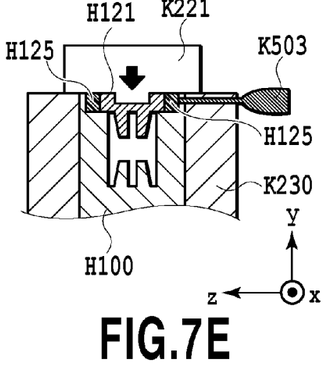

In the fourth step, the die slide mold K230 is moved, and as illustrated in FIG. 7D, the liquid-supply member H100 is located at a position that faces the cover member H121. After that, in the fifth step, the operation for returning the part slide mechanism is performed, and as illustrated in FIG. 7E, the cover member H121 that is supported by the mold piece K221 engages with the liquid-supply member H100. Furthermore, in the sixth step, the movable-side mold K200 and the stationary-side mold K100 are closed, and with the liquid-supply member H100 and the cover member H121 in positions so as to be in contact with each other, the resin that is compatible with both members is flowed from the injection nozzle K503 and joins the members together. In FIG. 7E, the resin that is flowed into the area where the liquid-supply member H100 and cover member H121 are joined is illustrated as a sealing material H125.

When the mold piece K221 is moved in the third step, depressions H124 may remain at the locations of the cover member H121 that receives the pressure from the push-out mechanisms K231. Therefore, in the sixth step, in order to prevent the sealing material H125 from flowing into the spaces that occurred due to the unevenness of such depressions H124, preferably pressure is applied that is sufficient so that the depressions 124 are squashed down when the mold is closed.

When the next die slide injection molding is performed after the completed liquid-supply member H100 has been pushed-out in the −Z direction in the seventh step, the part slide mechanism, or in other words, the mold piece 221 is returned to the first position. As a result, the push-out mechanisms K231 and the springs K233 are returned to the positions illustrated in FIG. 7A against the force of the springs K233.

With the embodiment explained above, by providing the push-out mechanisms K231 and the springs K233, it is possible for the parts that are molded in the primary molding to belong to a mold on a desired side stably in the stage of opening the mold for the die slide injection molding. As a result, it becomes possible to proceed with the die slide injection molding without being hindered, and to stabilize productivity of manufactured parts.

(Embodiment 2)

Figure 8A:
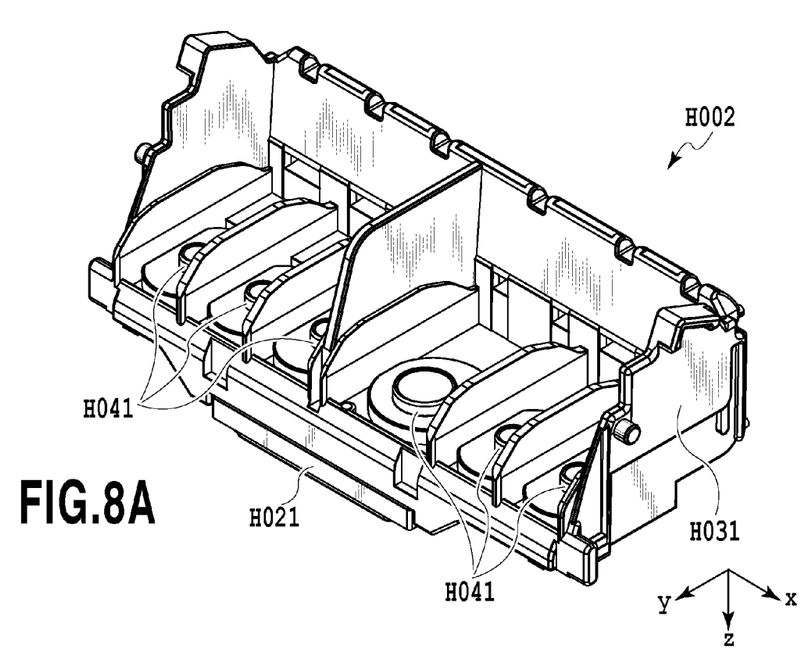
FIG. 8A and FIG. 8B are perspective views of a liquid-ejecting head of Embodiment 2.
Figure 8B:
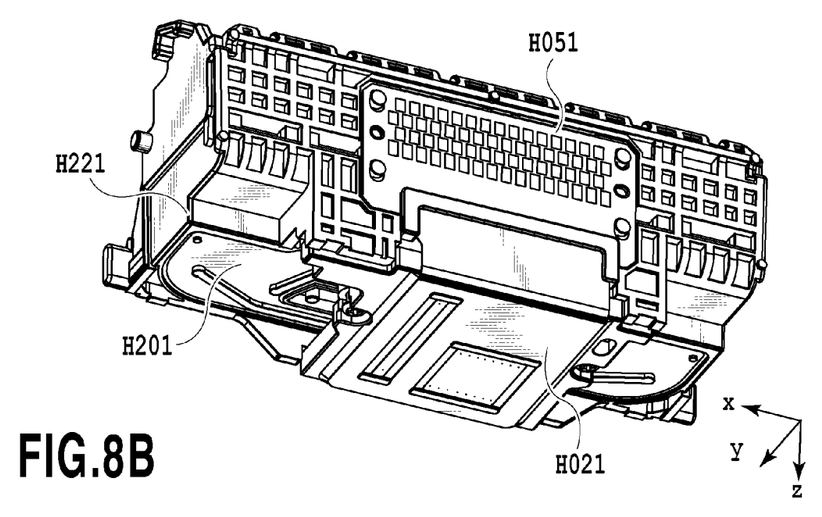

FIG. 8A and FIG. 8B are perspective views of a liquid-ejecting head H002 that is used in this embodiment as seen from different angles. The liquid-ejecting head H002 of this embodiment is a color inkjet printing head for printing images by ejecting 6 colors of ink. Each of the 6 colors of ink are stored in corresponding tanks, and then housed in a liquid-supply unit H031 by way of supply openings H041 that correspond to the respective ink colors. After that, the inks pass through liquid paths that are independently formed in the liquid-supply unit H031 for the respective ink colors and are guided to an ejection-element unit H021. In the ejection-element unit H021, plural ejection elements that correspond to each of the inks are arranged, and these ejection elements eject a corresponding ink as drops in the Z direction according to ejection signals based on image data.

The liquid-supply unit H031 of this embodiment, as illustrated in FIG. 8B, is manufactured by joining together an individually molded first molded part H201 and second molded part H221 in the Z direction. In the first molded part H201, grooves H202 for forming ink paths are formed in the surface of the first molded part H201 that faces the second molded part H221. On the other hand, through-holes H222 that connect the supply openings H401 and the grooves H202 of the first molded part H201 are formed in the second molded part H221. By joining the both together, a mechanism is formed in which the inks that are supplied from the through holes H222 passes through the liquid paths and are guided to the ejection-element unit H021.

Plural ejection elements that correspond to each of the inks are arranged in the ejection-element unit H021, and ejection signals that are based on image data are supplied from an electric connection board H051. The individual ejection elements eject ink as drops in the Z direction according to the ejection signals.

FIG. 9A to FIG. 9D are views illustrating a die slide injection molding process for molding the liquid-supply unit H031 of this embodiment. In referring to FIG. 9A, the mold used in this embodiment also includes a main mold K002 that includes a stationary-side mold K300 and a movable-side mold K400 that can be separated in the Z direction, and a die slide mold K430 that is inside the main mold K002 and that can move in the X direction with respect to the main mold K002. In this embodiment as well, the mold for the first molded part H201 and the mold for the second molded part H221 are arranged in locations that are shifted in the X direction of the surface where the die slide mold K430 and the stationary-side mold K300 face each other. Therefore, in a first step, with these molds closed, resin flowed from an ejection nozzle K601 and an ejection nozzle K602 forms the first molded part H201 and the second molded part H221, respectively.

Figure 9A:
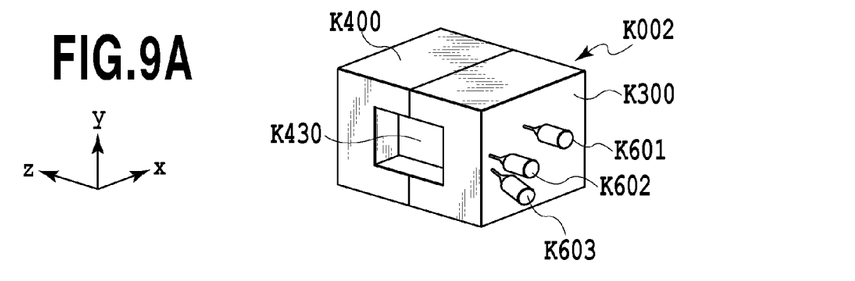
FIG. 9A to FIG. 9D are views illustrating the molding steps for forming a liquid-supply unit.
Figure 9B:
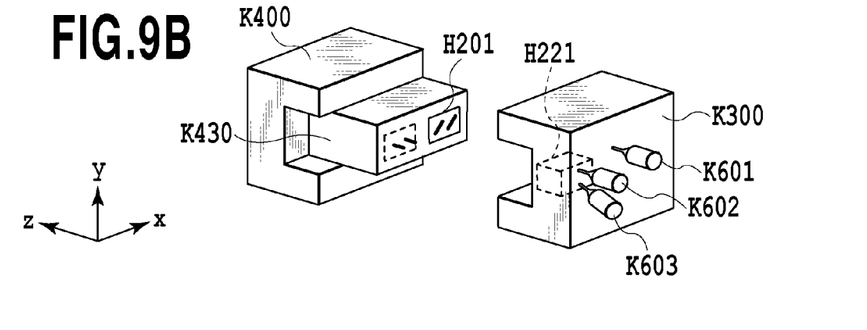

In a second step, as illustrated in FIG. 9B, the movable-side mold K200 is moved in the +Z direction with respect to the stationary-side mold K300, and these molds are separated. When doing this, in this embodiment, the first molded part H201 belongs to the movable-side mold K400 and moved in the +Z direction together with the die slide mold K430. On the other hand, the second molded part H221 remains in the stationary-side mold K300. The construction for the parts to belong to different sides in this way will be explained in detail later.

Figure 9C:
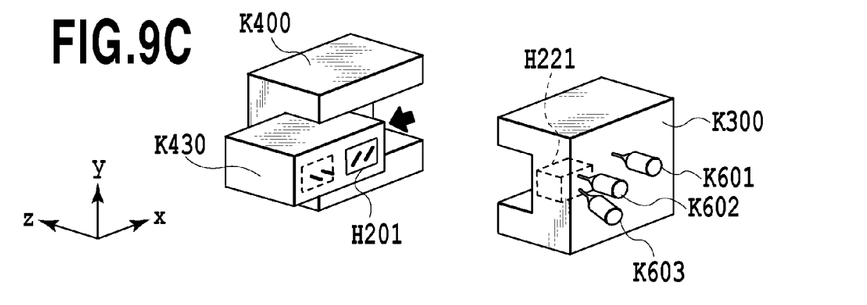

In a fourth step, as can be seen in FIG. 9C, the die slide mold K430 that is located inside the movable-side mold K400 is moved in the −X direction. Then, the first molded part H201 and the second molded part H221 are positioned and aligned in the X direction.

Figure 9D:
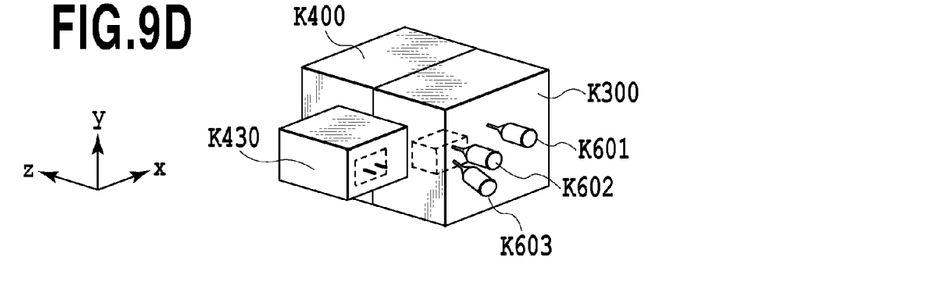

In a fifth step, as can be seen in FIG. 9D, the movable-side mold K400 is moved in the −Z direction, and closed with the stationary-side mold K300. Then, in this state, resin that is compatible with the both members is flowed from an injection nozzle K603 to a position where the first molded part H201 and the second molded part H221 are joined together.

Finally, the main mold K002 is opened and the liquid-supply unit H031 having a completed sealed hollow structure is pushed out in the −Z direction. As a result, the completed liquid-supply unit H031 that is manufactured by joining together the first molded part H201 and the second molded part H221 is obtained.

FIG. 10A to FIG. 10E are enlarged views for explaining the separated and joined states of the stationary-side mold K300 and the movable-side mold K400 in the second through fifth steps of the die slide injection molding process of this embodiment. In all of the views, the states are as seen from the +Y direction.

Figure 10A:
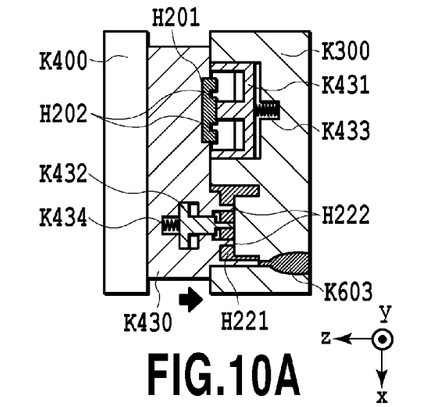
FIG. 10A to FIG. 10E are cross-sectional views illustrating the separated and joined states of a main mold.

In FIG. 10A, the grooves H202 are formed in first molded part H201 that is molded by the stationary-side mold K300 and the die slide mold K430 on the side of the stationary-side mold K300. On the other hand, the through-holes H222 that pass through from the side of the die slide mold K430 to the side of the stationary-side mold K300 are formed in the second molded part H221 that is molded by the stationary-side mold K300 and the die slide mold K430. Therefore, when the movable-side mold K400 is moved in the +Z direction, it becomes easy for the first molded part H201 to remain on the side of the stationary-side mold K300 and it becomes impossible to guess whether the second molded part H221 will belong to the stationary-side mold K300 or the die slide mold K230. In this embodiment, taking this situation into consideration, construction is such that the first molded part H201 will belong to the side of the die slide mold K430, and the second molded part H221 will belong to the side of the stationary-side mold K300. More specifically, a push-out mechanism K431 for pushing the first molded part H201 out to the side of the die slide mold K430, and a spring K433 for pressing the push-out mechanism K431 are provided on the side of the stationary-side mold K300. Moreover, a push-out mechanism K432 for pushing the second molded part H221 out to the side of the stationary-side mold K300, and a spring K434 for pressing the push-out mechanism K432 are provided on the side of the die slide mold K430.

Figure 10B:
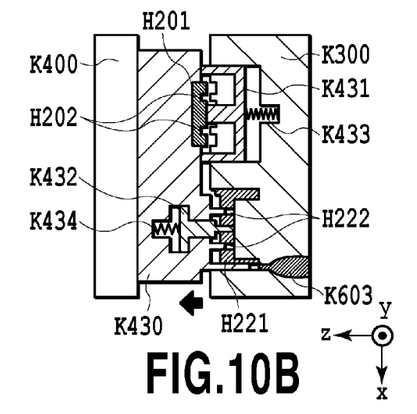
Figure 10C:
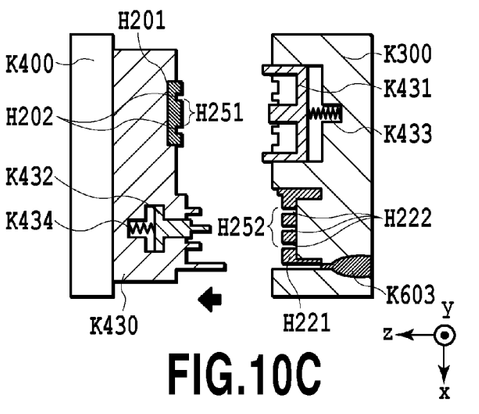

With this kind of construction, when the movable-side mold K400 moves in the +Z direction, as can be seen in FIG. 10B, the push-out mechanism K431 that is pressed by the spring K433 pushes the first molded part H201 out toward the die slide mold K430. Moreover, the push-out mechanism K432 that is pressed by the spring K434 pushes the second molded part H221 out toward the stationary-side mold K300. As a result, as illustrated in FIG. 10C, the first molded part H201 belongs to the die slide mold K430 and moves in the +Z direction, and the second molded part H221 remains in the stationary-side mold K300.

Figure 10D:
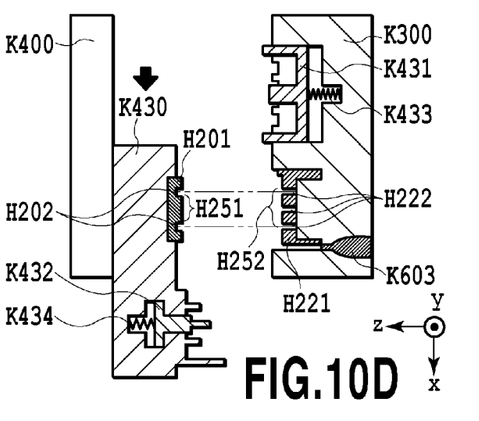
Figure 10E:
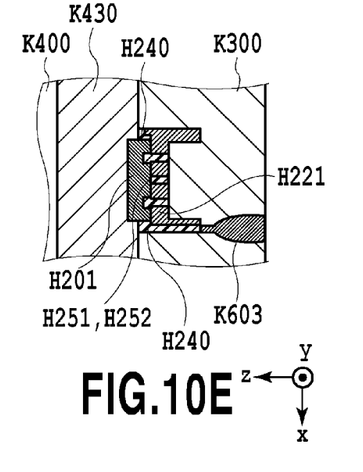

In the fourth step, the die slide mold K430 is moved, and as illustrated in FIG. 10D, the first molded part H201 and the second molded part H221 are arranged in positions facing each other. After that, in the fifth step, the stationary-side mold K300 and the movable-side mold K400 are closed again, and from the injection nozzle K603 to the position where the first molded part H201 and the second molded part H221 are joined together, the resin that is compatible with the both members is flowed to join the both together. In the views, the resin that is flowed into the area where the first molded part H201 and the second molded part H221 are joined together is indicated as a sealing material H240.

When the movable-side mold K400 moves in the second step, depressions H251 and H252 may remain in the locations of the first molded part H201 and second molded part H221 that receive the pressure from the push-out mechanisms K431 and K432. However, the positions that face these depressions H251 and H252, and the position where the sealing material H240 is injected in the fourth step differ. Therefore, even though a small space may occur in these opposing surfaces due to the unevenness of the depressions H251 and H252, there is very little concern that the sealing material H240 will flow into that space. Consequently, in this embodiment there is no need to close the mold with a force large enough to crush these depressions H251 and H252 as in Embodiment 1.

In the embodiment explained above as well, by providing the push-out mechanisms K431, K432 and the springs K433, K434, it is possible that the parts that were molded in the primary molding belong to molds on desired sides in the stage of opening the mold for the die slide injection molding. As a result, it is possible to proceed with the die slide injection molding smoothly and to improve the productivity of manufactured parts.

Above, a combination of push-out mechanisms and springs was used for making plural parts belong to desired sides when opening the mold after the primary molding, however, the present invention is not limited to this form. For example, it is also possible to prepare a drive source that generates hydraulic pressure or air suction pressure, and apply a force so that the parts are attached to a specified side when opening the mold.

Moreover, above, the case of joining together the two parts that were molded in the primary molding in the secondary molding was explained, however, the number of parts can be even more. For example, the cover member H121 that was explained in Embodiment 1, as can be seen in FIG. 4, became a side wall on the +Y direction side with respect to the liquid chambers H110, however, in the primary molding, it is also possible to mold a cover member that will become a side wall on the −Y direction side. In that case, in the third step, a second mold piece is moved out of the way in the −Y direction opposite from the mold piece K221 described above, and in the fifth step, that mold piece is moved in the +Y direction and the cover member is brought into contact with the −Y direction side of the liquid chambers H110. Furthermore, it is also possible to combine Embodiment 1 and Embodiment 2 to bring a part on the bottom surface side in contact with parts on the side surface sides from two different directions, and join the parts together at the same time or in order.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105118 filed May 25, 2015, which is hereby incorporated by reference wherein in its entirety.

What is claimed is:

1. A method for manufacturing a liquid-ejecting head that comprises an ejection-element unit that ejects liquid, and a liquid-supply unit in which a liquid path is formed for guiding the liquid to the ejection element unit,
   wherein a main mold that can be closed and separated in a first direction, a die slide mold that can slide in a second direction perpendicular to the first direction inside the main mold and in which a mold for molding a first part of the liquid-supply unit and a mold for molding a second part of the liquid-supply unit are arranged in the second direction, a mold piece that can slide inside the main mold in a third direction perpendicular to the first direction and the second direction and in which the mold for molding the second part is arranged, and a push-out mechanism having a contact member that can come in contact with the second part, and a spring that presses the member are prepared,
   the method including:
   a closing step for closing the main mold against a force of the spring;
   a first molding step for forming the first part and the second part by injecting resin into the mold for forming the first part and into the mold for forming the second part with the main mold in a closed state;
   an opening step for opening the main mold so that the first part that was formed by the first molding step is in the die slide mold, and the second part that was formed by the first molding step separates from the die slide mold and is in the mold piece;
   a sliding step for sliding the die slide mold and the mold piece, and positioning and aligning the first part and the second part in the second direction; and
   a second molding step for bringing the first part and second part into contact, and then closing the main mold and molding the liquid-supply unit by injecting resin for connecting the first part to the second part,
   wherein in the opening step, the contact member of the push-out mechanism pushes out the second part toward the mold piece in the third direction by a restoring force of the spring compressed in the closing step.

2. The method according to claim 1, wherein the push-out mechanism applies the restoring force to the second part at plural locations.

3. The method according to claim 1, wherein the push-out mechanism applies the restoring force to the second part at locations that differ from an area where the first part and the second part come in contact in the second molding step.

4. The method according to claim 1, wherein the liquid-ejecting head is an inkjet printing head that prints an image by ejecting a plurality of different inks, and in the liquid-supply unit, a liquid path for guiding ink from the supply opening to the ejection element unit is formed for each of the inks.

* * * * *